US009094306B2

(12) United States Patent
Eckert et al.

(10) Patent No.: US 9,094,306 B2
(45) Date of Patent: Jul. 28, 2015

(54) NETWORK POWER FAULT DETECTION

(71) Applicant: INTERNATIONAL BUSINESS MACHINES CORPORATION, Armonk, NY (US)

(72) Inventors: Martin Eckert, Moetzingen (DE); Roland Frech, Ostfildern (DE); Claudio Siviero, Schoenaich (DE); Jochen Supper, Herrenberg (DE); Otto A. Torreiter, Boeblingen (DE); Thomas-Michael Winkel, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 13/912,586

(22) Filed: Jun. 7, 2013

(65) Prior Publication Data
US 2013/0343200 A1 Dec. 26, 2013

(30) Foreign Application Priority Data

Jun. 26, 2012 (GB) .................................. 1211280.1

(51) Int. Cl.
H04L 12/26 (2006.01)
H04L 12/24 (2006.01)
H04L 12/10 (2006.01)
(52) U.S. Cl.
CPC ............ *H04L 43/0823* (2013.01); *H04L 12/10* (2013.01); *H04L 41/065* (2013.01); *H04L 41/0677* (2013.01)

(58) Field of Classification Search
None
See application file for complete search history.

(56) References Cited

U.S. PATENT DOCUMENTS

| 6,717,428 | B1 | 4/2004 | Spica |
| 7,989,986 | B2 | 8/2011 | Baarman et al. |
| 2002/0181178 | A1* | 12/2002 | Ortiz et al. ....................... 361/78 |
| 2009/0282292 | A1* | 11/2009 | Squire ............................. 714/39 |
| 2011/0085273 | A1* | 4/2011 | Bengtsson et al. .............. 361/65 |
| 2012/0013353 | A1 | 1/2012 | Frech et al. |
| 2012/0013356 | A1 | 1/2012 | Eckert et al. |
| 2013/0286852 | A1* | 10/2013 | Bowler et al. ................. 370/242 |
| 2013/0290791 | A1* | 10/2013 | Basile et al. ................. 714/47.1 |

OTHER PUBLICATIONS

Germida, Amy et al., "Defect Detection Using Power Supply Transient Signal Analysis," Proceedings of the 1999 IEEE International Test Conference, ITC '99, Sep. 1999, pp. 1-10.

Kapareliotis, E.S., et al., "Fault Recognition on Power Networks via SNR Analysis," Power Delivery, IEEE Transactions on, vol. 24, No. 4, pp. 2428, 2433, Oct. 2009, (Abstract Only—1 page).

(Continued)

*Primary Examiner* — Kerri Rose
(74) *Attorney, Agent, or Firm* — Margaret A. McNamara, Esq.; Matthew M. Hulihan, Esq.; Heslin Rothenberg Farley & Mesiti P.C.

(57) ABSTRACT

Network power fault detection. At least one first network device is instructed to temporarily disconnect from a power supply path of a network, and at least one characteristic of the power supply path of the network is measured at a second network device connected to the network while the at least one first network device is temporarily disconnected from the network.

11 Claims, 2 Drawing Sheets

(56) References Cited

OTHER PUBLICATIONS

Shihab, S., et al., "Detection of Fault Components on Power Lines Using Radio Frequency Signatures and Signal Processing Techniques," Power Engineering Society Winter Meeting, Jan. 2000, IEEE, vol. 4, pp. 2449, 2452, (Abstract Only—1 page).

"CAN Bus System & Topology Engineering Reference," Tritium Pty Ltd., Brisbane, Australia, Nov. 2006, pp. 1-8.

* cited by examiner

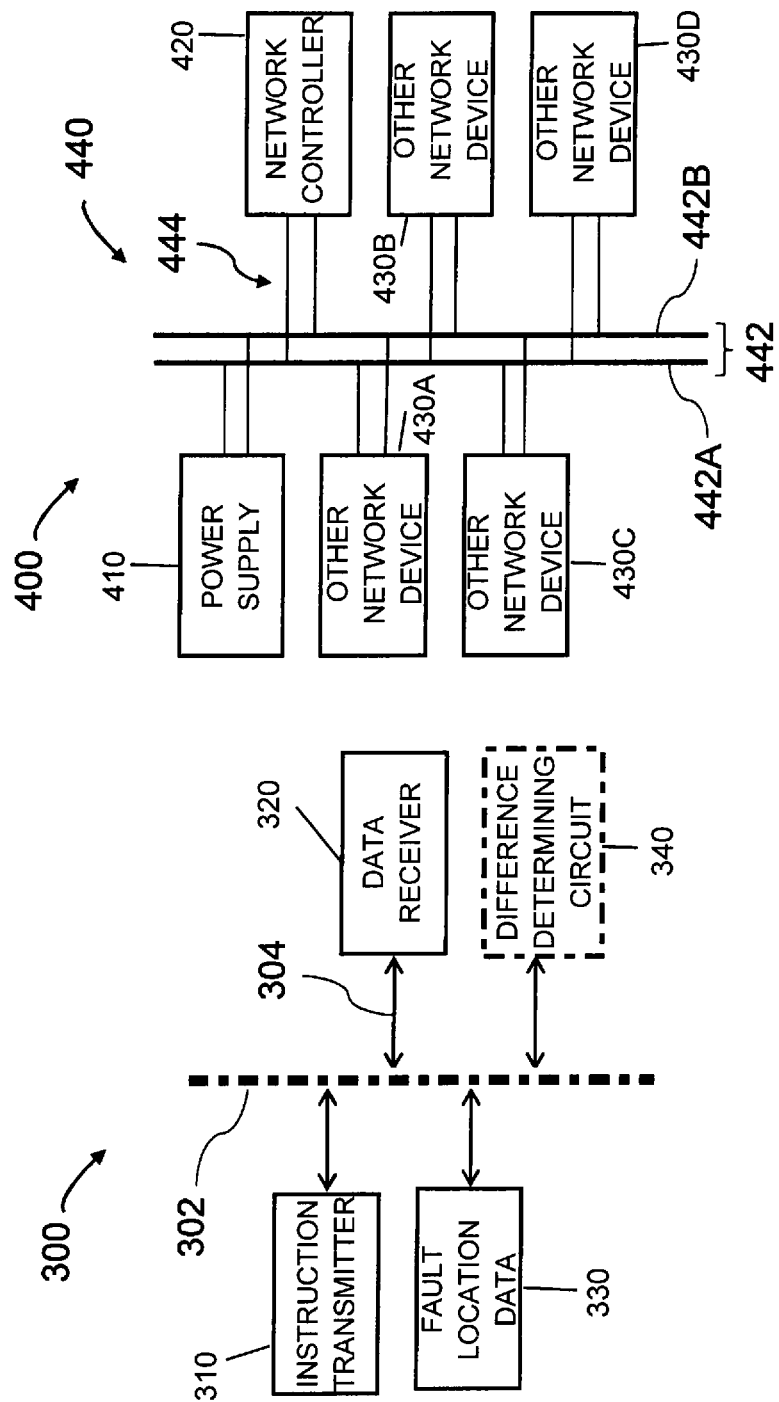

NETWORK POWER FAULT DETECTION

PRIOR FOREIGN APPLICATION

This application claims priority from United Kingdom patent application number 1211280.1, filed Jun. 26, 2012, which is hereby incorporated herein by reference in its entirety.

BACKGROUND

One or more aspects relate to a network power fault detection method, a network device as well as a corresponding system.

It is known to use networks to communicate data among a plurality of network devices. In many cases, the network is used to transport power from a power supply to one or more of the plurality of network devices. For example, such networks are used in cars and planes and for networking computers and computer peripherals.

BRIEF SUMMARY

Shortcomings of the prior art are overcome and additional advantages are provided through the provision of a network power fault detection method. The method includes, for instance, temporarily disconnecting at least one first network device from a power supply path of a network; and measuring, at a second network device connected to said network, at least one characteristic of said power supply path of said network while said at least one first network device is temporarily disconnected from said power supply path.

Network devices, systems and/or computer program products relating to one or more aspects are also described and may be claimed herein.

BRIEF DESCRIPTION OF THE SEVERAL VIEWS OF THE DRAWINGS

FIG. 3 schematically shows another embodiment of a network device in accordance with an aspect; and FIG. 4 schematically shows an embodiment of a system in accordance with an aspect.

DETAILED DESCRIPTION

Figure 1:
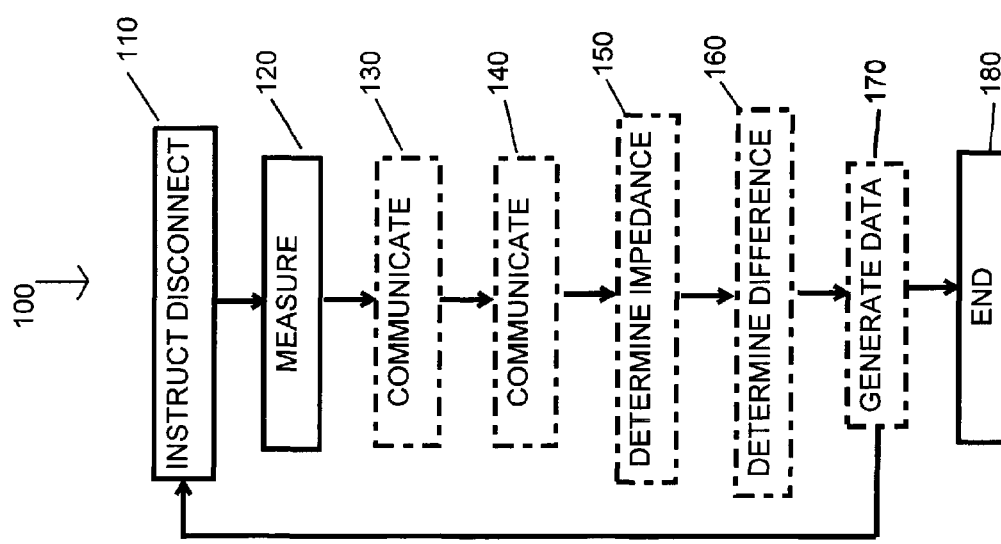
FIG. 1 shows a flow diagram of an embodiment of a network power fault detection method in accordance with an aspect.

FIG. 1 schematically shows an embodiment of a network power fault detection method 100 in accordance with one or more aspects, e.g. as described herein.

In the illustrated embodiment, flow diagram 100 includes a step 110 of instructing a first network device to temporarily disconnect from a power supply path of a network, a step 120 of measuring, at a second network device, at least one characteristic of the power supply path while the first network device is temporarily disconnected from the power supply path, an optional step 130 of communicating the measured characteristic from an integrated circuit that effected the measuring to a controller mounted on the same circuit board as the integrated circuit, an optional step 140 of communicating the measured characteristic from a controller (of one network device) to another network device, an optional step 150 of determining an impedance of the power supply path at the second network device as a function of frequency using the measured characteristic, an optional step 160 of determining a measure of difference between the determined impedance and a stored impedance, and an optional step 170 of generating fault location data using the measure of difference. Flow of the method may branch back to step 110 one or more times before proceeding to step 180, e.g. for the sake of (sequentially) conducting measurements at several different network devices (while a respective set of other network devices is disconnected from the power supply path).

Figure 2:
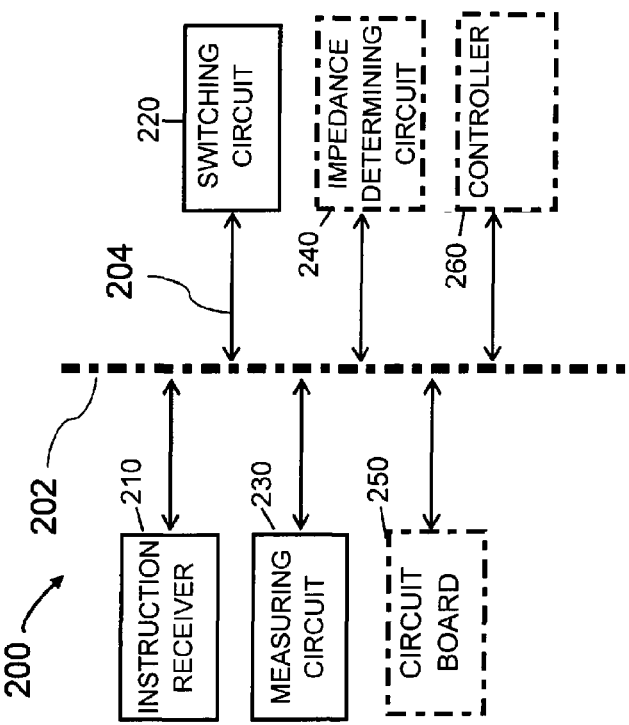
FIG. 2 schematically shows an embodiment of a network device in accordance with an aspect.

FIG. 2 schematically shows an embodiment of a network device 200 in accordance with one or more aspects, e.g. as described herein.

In the embodiment illustrated in FIG. 2, network device 200 includes an instruction receiver 210, a switching circuit 220, a measuring circuit 230, an optional impedance determining circuit 240, an optional circuit board 250, an optional controller 260, as well as an optional communication bus 202 comprising a plurality of communication links 204 (for the sake of legibility, only one of the communication links bears a reference sign). Communication bus 202 and the communication links 204 may communicatively interconnect components 210-260.

FIG. 3 schematically shows another embodiment of a network device 300 in accordance with one or more aspects, e.g. as described herein.

In the embodiment illustrated in FIG. 3, network device 300 includes an instruction transmitter 310, a data receiver 320, a fault location data generator 330, an optional difference determining circuit 340, as well as an optional communication bus 302 comprising a plurality of communication links 304 (for the sake of legibility, only one of the communication links bears a reference sign). Communication bus 302 and the communication links 304 may communicatively interconnect components 310-340.

FIG. 4 schematically shows an embodiment of a system 400 in accordance with one or more aspects, e.g. as described herein.

In the embodiment illustrated in FIG. 4, system 400 includes a (network) power supply 410, a network device that acts as a network controller 420, a plurality of other network devices 430A-430D as well as a network 440 having a trunk cable 442 and a plurality of branch cables 444 (for the sake of legibility, only one of the branch cables bears a reference sign). Network 440 interconnects each of (network) power supply 410, network controller 420 and network devices 430A-430D. Each of trunk cable 442 and branch cables 444 may be a multi-strand cable, i.e. a cable having a plurality of strands 442A, 442B. As exemplified in FIG. 4, the respective strands of the cables may be interconnected to cooperatively provide a plurality of distinct signal/power supply paths throughout the network. In other words, each signal/power supply path cooperatively provided by the respective cable strands may interconnect each of (network) power supply 410, network controller 420 and network devices 430A-430D.

Network controller 420 may sequentially instruct each of network devices 430A-430D to measure a characteristic of a power supply path of network 440. In response to the respective instruction, the others of network devices 430A-430D may temporarily disconnect from the power supply path. Upon issuing the respective instruction, network controller 420 may temporarily disconnect from the power supply path. The respective network device 430A-430D instructed to measure a characteristic of the power supply path may carry out the measuring while the others of network devices 430A-

430D and network controller 420 are temporarily disconnected from the power supply path.

As described herein, one or more aspects relate to network power fault detection. As an example, one or more aspects teach a network power fault detection method in which a characteristic of a power supply path of a network is measured at a device connected to the network while one or more devices that are normally connected to the power supply path are temporarily disconnected from the power supply path. By carrying out the measurement at one network device while one or more other network devices are temporarily disconnected from the power supply path, the influence of those other network devices on the measured characteristic of the power supply path can be reduced, thus allowing more precise measurement and allowing potential fault conditions in the power supply path to be more readily recognized. This is particularly true of non-catastrophic fault conditions, e.g. subtle changes in a characteristic of the power supply path over time that may be indicative of deterioration of the power supply path. As such, one or more aspects include teachings that allow the risk of catastrophic failure to be estimated and thus allows countermeasures to be taken before catastrophic failure occurs. For these reasons, the one or more aspects furthermore teach a network device that, in response to a given instruction (e.g. from a network controller), temporarily disconnects from a power supply path of a network. The network device may have a measuring circuit that measures a characteristic of a power supply path of a network and/or a switching circuit for selectively temporarily disconnecting the network device from a power supply path of the network.

Furthermore, in one or more aspects, the characteristic of the power supply path may be measured in the frequency domain. This likewise allows subtle changes in the characteristic of the power supply path to be more readily recognized, for example an impedance change on the order of several milliohms in a power supply path having a "normal" resistance of less than one milliohm.

Additionally, in one or more aspects, the measuring circuit and/or the switching circuit may be provided on the same circuit board as a controller of the network device. This allows the measuring circuit and/or the switching circuit to be relieved of the task of communicating over the network, which communication often involves complex protocols and thus requires complex circuitry. Instead, the network device controller can handle the task of communicating over the network and the measuring and/or switching circuit can communicate with the network device controller (and thus indirectly with other network devices) using a relatively rudimentary signal protocol, thus simplifying the design and reducing the cost of the measuring and/or switching circuit and simplifying redesign/retrofitting of network devices for improved network power fault detection.

In one aspect, the techniques include instructing at least one (first) network device to temporarily disconnect from a power supply path of a network.

In the context of one or more aspects, a "network" may be understood as a system having at least one tangible path that extends between a plurality of locations for conducting/guiding signals and/or power, e.g. electrical signals, electrical power, optical signals and/or optical power, between the plurality of locations.

In the context of one or more aspects, "network device" may be any device that sends and/or receives signals over the network, e.g. electrical and/or optical signals.

In the context of one or more aspects, a "network power supply" may be any device that provides power, e.g. electrical and/or optical power, to a(nother) network device over the network. A network power supply may be a network device, i.e. may send and/or receive signals over the network.

The network may include at least one tangible path that extends to any network device from any other network device and/or network power supply. In other words, the network may include at least one tangible path that interconnects (e.g. electrically and/or optically) any (two or more or each) of the network devices (for a transmission of signals and/or power therebetween). Similarly, the network may include at least one tangible path that interconnects (e.g. electrically and/or optically) any (one or more or all) of the network devices and any (one or more or all) of the network power supplies (for a transmission of signals and/or power therebetween). As such, any (one or more or all) of the tangible paths may be a branched path. Any (one or more or each) of the tangible paths may interconnect (e.g. electrically and/or optically) corresponding (input/output) terminals of any (two or more or each) of the network devices and/or network power supplies. For example, the network may include a branched wire path that interconnects a GND terminal of each of the network devices and network power supplies. Similarly, the network may include a branched optical fiber path that interconnects an optical data input/output terminal of each of the network devices. Any (one or more or each) of the network devices/network power supplies may connect to the network at a respective node, terminal node and/or endpoint of the network. Any (one or more or each) of the tangible paths of the network may have an electrical resistance of less than 10 mΩ between any two points on the tangible path. Any (one or more or each) of the tangible paths may include one or more optical to electrical converters (e.g. a photovoltaic device) and/or an electrical to optical converter (e.g. a laser diode), e.g. for converting optical signals/power transmitted on one segment of the respective tangible path to electrical signals/power transmitted on another segment of the respective tangible path or vice-versa. Any (one or more or each) of the converters may be located at a terminal node of the network. Similarly, any (one or more or each) of the converters may be located at a point of interconnection of a respective network device and the network.

The network may include at least one cable including at least one fiber optic strand and/or wire strand. In other words, the cable may be a single-strand or multi-strand cable. Any (one or more or each) of the (cable) strands may have a length of greater than 10 cm or greater than 1 meter. Any (one or more or each) of the (cable) strands may have a length of less than 1 meter, less than 10 meters or less than 100 meters. Any of the wire strands may be formed of copper or any other material of comparable electric conductivity. Any (one or more or each) of the (cable) strands may be individually insulated, e.g. electrically and/or optically, e.g. on an outer circumference of the respective strand. Any (one or more or each) of the (cable) strands may constitute at least part of a respective tangible path of the network. For example, the network may be a single-strand or multi-strand cable. Such a network is often termed a "linear bus." Similarly, the network may include a single-strand or multi-strand (trunk) cable having one or more single-strand or multi-strand (branch) cables branching (e.g. at a branch node) from the trunk cable or from any of the branch cables, e.g. in a tree-like fashion. Such a network is often termed a "distributed bus." The network may include one or more connectors (e.g. electrical and/or optical connectors) that respectively connect any (one or more or each) of the individual strands of any (one or more or each) of the branch cables to respective strands of other branch cables and/or to respective strands of the trunk cable such that the connected branch cable strands carry, in essence, the same signal as the respectively corresponding branch/trunk cable strands. Any (one or more or each) of the connectors may be a passive connector, i.e. a connector that does not consume power. Furthermore, the network may be a set of (insulated and/or uninsulated) wires and/or cables having a topology as described in the preceding sentences.

The network may include one or more power supply paths. In the context of one or more aspects, a "power supply path" may be a tangible path of the network that is capable of individually transporting power, e.g. electrically and/or optically, from one location on the network to another location on the network, e.g. from a network power supply to a(nother) network device. Similarly, a "power supply path" may be a set of tangible paths of the network that are capable of cooperatively transporting power, e.g. electrically and/or optically, from one location on the network to another location on the network, e.g. from a network power supply to a(nother) network device. An example of such a set of tangible paths is a (twisted) pair of wires, e.g. a pair of wires—one bearing a "ground-level" voltage and the other bearing a "power-level" voltage. A "power supply path" may moreover be a set of tangible paths of the network that are designated, e.g. by a network standard defining a (communication) protocol used by any of the network devices for sending/receiving signals over the network, for a transport of power, e.g. electrically and/or optically, from one location on the network to another location on the network. A "power supply path" may moreover be a tangible path having a non-zero voltage falling within a specified range, e.g. as specified (relative to ground or other known potential) by a network standard defining a (communication) protocol used by any of the network devices for sending/receiving signals over the network. The amount of power transported via the power supply path may be higher than the amount of power required/used for a communication of data between two network devices via a tangible path across the network, e.g. as defined by a network standard defining a (communication) protocol used by any of the network devices for sending/receiving signals over the network. Similarly, the voltage on the power supply path may be higher than a maximum voltage required/used for a communication of data between two network devices via a tangible path across the network, e.g. as defined by a network standard defining a (communication) protocol used by any of the network devices for sending/receiving signals over the network. The amount of power transported via the power supply path may be on the order of a power consumed by anywhere from one to five, one to ten, one to twenty or one to fifty network devices. The amount of power transported via the power supply path may be on the order of or equal to a power consumed by one or more or all of the network devices connected to the power supply path with the exception of the network power supplies. In the case of an optical transport of power, any (one or more or each) of the network devices connected to the power supply path may include a photovoltaic device that converts the optical power into electrical power. Similarly, as described herein, power transmitted optically within the network may be converted within the network to electrical power by an optical to electrical converter. The optical to electrical converter may be provided at a node at which a respective network device connects to the network.

The network may include one or more signal paths. In the context of one or more aspects, a "signal path" may be a tangible path of the network that is capable of individually communicating a (data/control) signal, e.g. electrically and/or optically, from one location on the network to another location on the network, e.g. from one network device connected to the network to another network device connected to the network. Similarly, a "signal path" may be a set of tangible paths of the network that are capable of cooperatively communicating (data/control) signals, e.g. electrically and/or optically, from one location on the network to another location on the network. An example of such a set of tangible paths is a (twisted) pair of wires. A "signal path" may moreover be a set of tangible paths of the network that are designated, e.g. by a network standard defining a (communication) protocol used by any of the network devices for sending/receiving signals over the network, for a communication of (data/control) signals, e.g. electrically and/or optically, from one location on the network to another location on the network. Communication of (data/control) signals across the network may be effected in parallel using a plurality of tangible paths of the network and/or serially using individual tangible paths and/or paired tangible paths of the network.

In one aspect, the signal paths of a network may be distinct from the power supply paths of the network. Any (one or more or each) of the power supply paths of a network may have a lower electrical resistance than any (one or more or all) of the signal paths of the network. Any (one or more or each) of the power supply paths may have an electrical resistance of less than 10 mΩ between any (two or more or each) of the network devices.

As described herein, a "network device" may be any device that sends and/or receives signals over the network, e.g. electrical and/or optical signals. The sending/receiving may be effected via one or more tangible paths of the network. The network device may include one or more terminals, each terminal being physically connected to and/or in electrical/optical communication with a respective tangible path of the network. A network standard defining a (communication) protocol used by any of the network devices for sending/receiving signals over the network may specify the respective role of any (one or more or each) of the terminals of the network device. For example, a network standard may specify one terminal as having the role of a GND terminal and another terminal as having the role of a $V_{DD}$ terminal. In one embodiment, two or more or each of the network devices may send/receive the signals over the network in accordance with a common (communication) protocol. As such, the network device may include a controller that sends and/or receives signals over the network (via any of the terminals) in accordance with a given (communication) protocol. The signals sent/received over the network may include data signals (e.g. binary data signals) and/or control signals (e.g. handshaking or arbitration signals). Any (one or more or all) of the network devices may receive power via a power supply path of the network, e.g. may be powered by a power supply that supplies power to a (respective) power supply path of the network. In this respect, the power supply and the respective network devices may be in electrical/optical communication with a power supply path of the network. Any (one or more or all) of the network devices may send and/or receive signals over the network in accordance with the CAN 2.0 standard or the ISO 11898 standard.

In one embodiment, the network may be a bus. For example, the network may conform to the CAN 2.0 standard, e.g. may be a bus conforming to the CAN 2.0 standard. The network may conform to the ISO 11898 standard, e.g. may be a bus conforming to the ISO 11898 standard. The network may be a network conforming to any of the IEEE 802.3 standards, i.e. an Ethernet network. The network may be mounted in a vehicle, e.g. in a plane or automobile.

The aforementioned instructing may include communicating an instruction over the network, e.g. an instruction that signifies that the at least one (first) network device is to temporarily disconnect from a power supply path of the network. The instruction may originate from a network device capable of performing network diagnostics, e.g. from a network device that serves as a network controller. The instruction may be communicated as a control signal. The instruction may be a (predetermined) sequence of binary bits, e.g. a sequence of binary bits specified by a (communication) protocol used by any of the network devices for sending/receiving signals over the network. The instruction may be broadcast on the network or may be addressed specifically to one or more network devices. Such addressing may specify which network devices are the intended recipients of the instruction and/or may specify which network devices are to execute the instruction. For example, the network device from which the instruction originates may broadcast the instruction (to all other network devices) or may address the instruction for (selective/specific) receipt/execution by one or more of the network devices. As such, the instructing may include sending an instruction from a network device, e.g. from a network device from which the instruction originates, and receiving (and executing) the instruction at another network device. The instruction may passively signify that the at least one network device is to temporarily disconnect from a power supply path of the network. For example, an instruction addressed to one network device signifying that that one network device should measure a characteristic, e.g. a voltage and/or current supplied via a power supply path of the network, may be interpreted by one or more other network devices as signifying that those other network devices should temporarily disconnect from the power supply path. Similarly, in the case of a network controller, the network controller may temporarily disconnect from the power supply path immediately after issuing such an instruction. In response to an instruction to temporarily disconnect from a power supply path, a network device may moreover temporarily disconnect from any (one or more or all) signal path of the network.

In the context of one or more aspects, "disconnecting" a network device from a tangible path, e.g. from a power supply path, of a network may be understood as modifying a state of the tangible path and/or network device such that a communication of signals/power between the network device and the tangible path is (substantially) prevented. As such, "disconnecting" may include physically separating the network device from the tangible path, e.g. by means of a relay. Similarly, "disconnecting" may include increasing an electrical resistance at an interface of the network device and the tangible path, e.g. by several orders of magnitude, e.g. by use of a semiconducting switching device such as a transistor. Similarly, "disconnecting" may include blocking a transmission of optical signals at an interface of the network device and the tangible path, e.g. by use of an optical switching device such as a liquid crystal device.

In the context of one or more aspects, "temporarily" may mean for a duration selected from the group of up to 50 ms, up to 1 second and up to 5 seconds.

The instructing at least one (first) network device to temporarily disconnect from a power supply path of a network may include instructing all but one network device (e.g. of the network devices otherwise connected to the power supply path and/or excepting any network power supplies) to temporarily disconnect from the power supply path of the network. Similarly, the instructing at least one (first) network device to temporarily disconnect from a power supply path of a network may include instructing, at most, all except one network power supplies (otherwise connected to the power supply path) to temporarily disconnect from the power supply path of the network.

One or more aspects may include measuring at least one characteristic of a power supply path. Such measuring may be carried out by any (one or more or each) network device (designated hereinbelow as a "second" network device for the sake of easier reference), e.g. by any (one or more or each) network device connected to the power supply path. (In the context of one or more aspects, a "network device connected to a network/power supply path" may be understood as a network device that receives power and/or otherwise (e.g. electrically/optically) interacts with the network/power supply path.) The respective measuring may be carried out while any (one or more or all) other network devices (with the optional exception of any (one or more or all) of the network power supplies) otherwise connected to the power supply path are temporarily disconnected from the power supply path. For example, one or more aspects may include sequentially instructing each of the network devices normally connected to the power supply path (optionally excepting any (one or more or all) of the network power supplies) to measure at least one characteristic of the power supply path, all but the respective (second) measuring network device and the network power supplies being instructed (explicitly or implicitly) to temporarily disconnect from the power supply path during the respective measuring. The measuring may be effected at the respective (second) network device. For example, the measuring may be effected proximate to an interface of the respective (second) network device and the network/power supply path.

The at least one measured characteristic may include at least one electrical and/or optical characteristic of the power supply path and/or of a signal communicated via the power supply path. The at least one measured characteristic may include any characteristic selected from the group of voltage, current, power, resistance, impedance, capacitance, (light) intensity and (optical) spectrum. The characteristic may be measured as a function of frequency/wavelength. The voltage/current/power may be a voltage/current/power supplied via the power supply path. The resistance/impedance/capacitance may be a resistance/impedance/capacitance of the power supply path. The (light) intensity/(optical) spectrum may be a (light) intensity/(optical) spectrum of light supplied via the power supply path.

One or more aspects may include generating fault location data, e.g. data indicative of a (probable) location of a potential or certain (i.e. unquestionable) fault in the power supply path. The fault location data may specify the (probable) location relative to any (one or more or each) branch/trunk cable strand of the network/power supply path. Similarly, the fault location data may specify the (probable) location relative to any (one or more or each) node of the network/power supply path. The generating of fault location data may be carried out by a network controller of the network.

The fault location data may be generated using any (one or more or all) of the at least one characteristics measured by any (one or more or each) of the network devices. Furthermore, the fault location data may be generated using data obtained using any (one or more or all) of the at least one characteristic measured by any (one or more or each) of the network devices. For example, the fault location data may be generated by a network controller using an impedance value communicated across the network, which impedance value was calculated by a network device from a voltage value measured at that network device.

The fault location data may be generated using topology data representative of a topology of the network, e.g. a topology of any (one or more or each) of the power supply paths. For example, the topology data may be representative of a location of any (one or more or each) branch nodes in the network/power supply path. The topology data may specify the respective location of any branch node relative to any (one or more or each) other node of the network/power supply path, e.g. relative to any (one or more or each) of the terminal nodes of the network/power supply path. The topology data may be representative of a respective location at which any (one or more or each) of the network devices connects to the network/power supply path. For example, the topology data may be representative of a respective location at which each of the aforementioned second network device and the aforementioned at least one first network device connects to the network. The topology data may be representative of a respective location at which any (one or more or each) of the network power supplies connects to the network/power supply path. The topology data may be representative of the relative location of any (one or more or each) branch/trunk cable strand of the network/power supply path relative to any (one or more or each) other branch/trunk cable strand of the network/power supply path.

One or more aspects may include determining an impedance of a power supply path, e.g. a respective impedance at any (one or more or each) network device. The (respective) impedance may be an impedance selected from the group of impedance relative to ground, an impedance relative to any one of the network power supplies and an impedance between any two tangible paths of the network (e.g. between each wire of a twisted pair constituting a power supply path). The impedance may be determined using a characteristic of a power supply path measured at the (respective) network device, e.g. using a voltage/current supplied via the power supply path as measured at the (respective) network device. The impedance may be determined as a function of frequency. The determining of an impedance of a power supply path may be carried out by any network device, e.g. by a network device that measured a characteristic of the power supply path used to determine the impedance or by a network controller of the network.

One or more aspects may include determining a measure of difference between two measurements (e.g. as described hereinabove) of a characteristic of a power supply path. For example, the one or more aspects may include determining a measure of difference between a respective measurement of a characteristic of a power supply path at any (one or more or each) of the network devices (optionally excepting any (one or more or all) of the network power supplies) and a measurement of the same characteristic of the power supply path at the respective network device. In other words, one or more aspects may include determining a measure of difference between a characteristic of a power supply path measured at a first point in time and the same characteristic of the power supply path measured at a second point in time, e.g. as measured at the same location in the network for each of one or more locations in the network. One or more aspects may include measuring a given characteristic of the power supply path at any (one or more or each) of the network devices every time the network controller is powered up. The measurement carried out at an earlier point in time may be stored, e.g. by any network device (e.g. by the measuring network device or a network controller), until the later measurement. One or more aspects may include determining a measure of difference between a determined/measured impedance of a power supply path and a stored impedance. The measure of difference may be indicative of a difference exceeding a given threshold in a given frequency range (of the characteristic) and/or of a difference not exceeding a given threshold in a(nother) given frequency range (of the characteristic). The determining of a measure of difference between two measurements may be carried out by any network device, e.g. by a network device that carried out at least one of the two measurements or by a network controller of the network.

The aforementioned generating of fault location data may use the determined measure of difference. For example, a change in impedance of the power supply path at some frequencies as measured at several respective network devices (e.g. relative to earlier measurements at those network devices) may be indicative of deterioration of the electrical insulation of a branch of the network that leads to those network devices. Moreover, the generating of fault location data may include subtracting a first measure of difference from a second measure of difference. For example, a first measure of difference between two measurements of a characteristic of a power supply path as measured at a first network device may be subtracted from a second measure of difference between two measurements of the same characteristic of the power supply path as measured at a second network device (topologically) more distal from the network power supply connected to the power supply path than the first network device. In the present context, the relative expression "(topologically) more distal" may be understood as a relationship where a potential fault indicated by the first measure of difference may, by virtue of the topology of the network, be expected to impact the second measure of difference.

The measuring by a respective (second) network device may be performed by an integrated circuit mounted on a circuit board of the respective (second) network device.

One or more aspects may include communicating any (one or more or each) of the at least one characteristic measured by the respective (second) network device from the integrated circuit to a (network device) controller mounted on the circuit board. Similarly, one or more aspects may include communicating data obtained using any (one or more or all) of the at least one characteristic measured by the respective (second) network device from the integrated circuit to the (network device) controller mounted on the circuit board. Such obtained data may include a measure of difference between two measurements and/or a determined impedance of a power supply path, e.g. as described supra. The communicating may be carried out using a first communication protocol. In the context of one or more aspects, "communicating" may include transmitting the communicated information from one device and receiving the communicated information at another device. As such, the one (transmitting) device may include a transmitter and the other (receiving) device may include a receiver, e.g. a transmitter/receiver (specifically) for the communicating.

One or more aspects may include communicating any (one or more or each) of the at least one characteristic measured by the respective (second) network device from the (network device) controller to another network device (connected to the network), e.g. to a network controller. Similarly, one or more aspects may include communicating data obtained using any (one or more or all) of the at least one characteristic measured by the respective (second) network device from the (network device) controller to another network device (connected to the network), e.g. to a network controller. The communicating may be carried out using a second communication protocol. The first communication protocol may be less complex and/or require less hardware to implement than the second communication protocol.

One or more aspects may include measuring, at a network power supply, a (first) current supplied by the network power supply to a power supply path of the network (at a given time, e.g. at a first time). Similarly, one or more aspects may include measuring, at the network power supply, a second current supplied by the network power supply to the power supply path of the network (at a second time distinct from the first time). The (amperage of) the second current may differ from the first current by at least 10% or 50% of the first current. The measuring of one or more currents may be carried out while any (one or more or all or all but one) of the (other) network devices is disconnected from the power supply path. The measuring of one or more currents may be carried out each time a network device is instructed to measure a characteristic of a (respective) power supply path. The measuring of a current (e.g. the measuring of the first/second current) may be carried out by the network power supply, e.g. by a current measuring circuit of the network power supply. One or more aspects may include communicating any (one or more or each, e.g. the first/second) measured current from the network power supply to a(nother) network device, e.g. to a network controller and/or to a respective network device that measured a characteristic of the power supply path at essentially the same time as the measuring of the (first/second) current at the network power supply.

The aforementioned determining of a (respective) impedance of a power supply path may use any (one or more or all) of the measured currents. Similarly, the aforementioned generating of fault location data may use any (one or more or all) of the measured currents.

While the teachings of the present disclosure have been discussed hereinabove mainly in the form of a method, the teachings may be embodied, mutatis mutandis, in the form of a network device or a system, as will be appreciated by the person skilled in the art.

The network device may include an instruction receiver that receives an instruction to temporarily disconnect from a power supply path of a network, e.g. as described above.

The network device may include a switching circuit that, e.g. in response to an instruction to temporarily disconnect from a power supply path, temporarily disconnects the network device from the power supply path, e.g. as described above. In this respect, the network device may have a timer that, in response to receipt of a signal indicating the beginning of a disconnection period, issues a signal indicating the end of the disconnection period (after a given period of time). The switching circuit may reconnect the network device to the power supply path in (direct or indirect) response to the signal indicating the end of the disconnection period. The network device may also include a power storage device, e.g. a (super) capacitor, that provides power to the network device when the network device is temporarily disconnected from the power supply path. In response to an instruction to temporarily disconnect from a power supply path, the switching circuit may moreover temporarily disconnect the network device from any (one or more or all) signal path of the network.

The network device may include a measuring circuit that measures at least one of characteristic of a power supply path of a network, e.g. as described above.

The network device may include an impedance determining circuit that determines an impedance of a power supply path, e.g. as described above.

The network device may include a circuit board, e.g. as described above.

The network device may include a controller, e.g. as described above.

The network device may include an instruction transmitter that transmits an instruction to at least one other network device, e.g. as described above.

The network device may include a data receiver that receives data communicated from one or more network devices, e.g. as described above.

The network device may include a fault location data generator that generates fault location data, e.g. as described above.

The network device may include a difference determining circuit that determines a measure of difference, e.g. as described above.

Any (one or more or each) of the aforementioned components of the network device may communicate with any (one or more or all) other of the aforementioned components of the network device. In this respect, the network device may include one or more communication links interconnecting the respective components.

The system may be configured and adapted to effect any of the actions described above with respect to one or more aspects of the disclosed method. For example, the system may include control components that effect any of the actions described above with respect to the one or more aspects.

As will be appreciated by one skilled in the art, aspects of the present disclosure may be embodied as a system, method or computer program product. Accordingly, aspects of the present disclosure may take the form of an entirely hardware embodiment or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the figures illustrate the architecture, functionality, and operation of possible implementations of systems, methods and computer program products according to various embodiments of the present disclosure. In this regard, each block in the block diagrams may represent a module, segment, or portion of code, which includes one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof. In aspects of the present disclosure, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of aspects of the present invention has been presented for purposes of illustration and description, but is not intended to be exhaustive or limited to aspects of the invention in the form disclosed. Many modifications and variations will be apparent to those of ordinary skill in the art without departing from the scope and spirit of aspects of the invention. The embodiment was chosen and described in order to best explain aspects of the invention and the practical application, and to enable others of ordinary skill in the art to understand aspects of the invention for various embodiments with various modifications as are suited to the particular use contemplated.

What is claimed is:

1. A network power fault detection method comprising:
    temporarily disconnecting at least one first network device from a power supply path of a network;
    measuring, at a second network device connected to said network, at least one characteristic of said power supply path of said network while said at least one first network device is temporarily disconnected from said power supply path, wherein said measuring at said second network device is performed by an integrated circuit mounted on a circuit board of said second network device;
    communicating at least one of said at least one measured characteristic and data obtained using said measured at least one characteristic from said integrated circuit to a controller mounted on said circuit board; and
    communicating said at least one of said at least one measured characteristic and said data obtained using said measured characteristic from said controller to another network device connected to said network.

2. The method of claim 1, further comprising:
    generating fault location data using topology data representative of a topology of said network and data obtained using said measured at least one characteristic.

3. The method of claim 2, wherein said topology data is representative of a respective location at which each of said second network device and said at least one first network device connects to said network.

4. The method of claim 2, wherein said at least one characteristic comprises at least one of a voltage or a current supplied via said power supply path, and wherein said method further comprises:
    determining an impedance of said power supply path at said second network device as a function of frequency using at least one of said measured voltage or current.

5. The method of claim 4, further comprising:
determining a measure of difference between said determined impedance and a stored impedance, wherein
said generating fault location data uses said measure of difference.

6. The method of claim 2, further comprising:
instructing said at least one first network device and said second network device to temporarily disconnect from said power supply path; and
measuring, at a third network device connected to said network, at least one characteristic of said power supply path while said at least one first network device and said second network device are temporarily disconnected from said network, wherein said generating fault location data uses data obtained using said at least one characteristic measured at said third network device.

7. A network device comprising:
an instruction receiver to receive an instruction to temporarily disconnect from a power supply path of a network;
a switching circuit to temporarily disconnect said network device from said power supply path based on the instruction to temporarily disconnect from said power supply path;
a circuit board;
a controller mounted on said circuit board; and
a measuring circuit mounted on said circuit board to measure at least one characteristic of said power supply path of said network, wherein said measuring circuit communicates at least one of said at least one measured characteristic and data obtained using said at least one measured characteristic to said controller, and wherein said controller communicates said at least one of said at least one measured characteristic and said data obtained using said at least one measured characteristic to another network device connected to said network.

8. The network device of claim 7, wherein said at least one characteristic comprises at least one of a voltage or a current supplied via said power supply path, and wherein said network device further comprises:
an impedance determining circuit to determine an impedance of said power supply path at said network device as a function of frequency using at least one of said measured voltage or current.

9. The network device of claim 7, wherein:
said measuring circuit communicates with said controller using a first communication protocol; and
said controller communicates with said other network device using a second communication protocol.

10. A network device comprising:
an instruction transmitter to transmit an instruction to at least one network device to temporarily disconnect from a power supply path of a network;
a data receiver to receive impedance data from a plurality of network devices; and
a fault location data generator to generate fault location data using topology data representative of a topology of said network and said impedance data, wherein said topology data is representative of a respective location at which each of said plurality of network devices and said at least one network device connects to said network.

11. The network device of claim 10, comprising:
a difference determining circuit to determine, for each of said plurality of network devices, a measure of difference between said impedance data and stored impedance data, wherein said fault location data generator is to use said measure of difference to generate said fault location data.

* * * * *